(12) United States Patent
Kaluza et al.

(10) Patent No.: US 11,894,976 B1
(45) Date of Patent: Feb. 6, 2024

(54) AUTOMATED PREDICTIVE CHANGE ANALYTICS

(71) Applicant: E.S.I. SOFTWARE LTD., Givat Shmuel (IL)

(72) Inventors: Bostjan Kaluza, Ljubljana (SI); Eyal Oz, Petah Tikva (IL); Michael Noam, Rosh Ha Ayin (IL); Alexander Sasha Gilenson, Givatayim (IL)

(73) Assignee: E.S.I. SOFTWARE LTD., Givat Shmuel (IL)

( * ) Notice: Subject to any disclaimer, the term of this patent is extended or adjusted under 35 U.S.C. 154(b) by 0 days.

(21) Appl. No.: 17/992,964

(22) Filed: Nov. 23, 2022

(51) Int. Cl.
*H04L 41/0813* (2022.01)
*H04L 41/14* (2022.01)

(52) U.S. Cl.
CPC ........ *H04L 41/0813* (2013.01); *H04L 41/145* (2013.01)

(58) Field of Classification Search
CPC .......................... H04L 41/145; H04L 41/0813
USPC ........................................................ 709/220
See application file for complete search history.

(56) References Cited

U.S. PATENT DOCUMENTS

| | | | | |
|---|---|---|---|---|
| 9,137,121 | B1* | 9/2015 | Sinn | H04L 41/0816 |
| 2003/0200149 | A1* | 10/2003 | Gonzalez | H04L 41/082 |
| | | | | 705/26.1 |
| 2009/0327000 | A1* | 12/2009 | Davis | G06Q 10/06375 |
| | | | | 705/7.28 |
| 2012/0245917 | A1* | 9/2012 | Chawla | H04L 12/4641 |
| | | | | 703/22 |
| 2013/0204837 | A1* | 8/2013 | Sabharwal | G06F 16/235 |
| | | | | 707/E17.005 |
| 2019/0268366 | A1* | 8/2019 | Zeng | G06N 3/047 |
| 2019/0278699 | A1* | 9/2019 | Sharma | G06F 9/451 |
| 2021/0051067 | A1* | 2/2021 | Barkovic | G06F 9/451 |

* cited by examiner

*Primary Examiner* — Zi Ye
(74) *Attorney, Agent, or Firm* — SOROKER AGMON NORDMAN RIBA; Daniel B. Schatz

(57) ABSTRACT

A method of evaluating change risk in an IT environment, including collecting environment state snapshots of configuration parameters in the IT environment, invoking a manifest of a change on the environment state snapshots to form simulated environment state snapshots, analyzing the simulated environment state snapshots relative to the environment state snapshots, deriving a risk score based on the analysis and selectively perform the change responsive to the risk score.

20 Claims, 11 Drawing Sheets

| Path | Value |
|---|---|
| ▼ 🖥 vm08-MgrTestAws | |
|    ▼ 🖥 Microsoft Windows 2016 | |
|       □ MSSQLSERVER | |
|       ▶ ⊚ Registry | |
|       ▲ ⊚ OS | |
| ▶ 🖥 Tomact:8080 | |
|       ▶ ⊚ Bios [NAME=Defult System BIOS] | |
| ▶ 🖥 vm08-MgrTestAzure | |
|       ▶ ⊚ Boot Information | |
| ▶ 🖥 vm08-MgrTestGC | |
|       ▶ ⊚ Computer System Product | |
|       ▲ ⊚ Installed Componets | |
|          ▲ ★ Active Directory Authentication Library for SQ_ | |
|              ☆ DisplayVersion | 15.0.1300.359 |
|              □ HelpLink | https://go.microsoft.com/fwlink/?LinkID=$2$611 |
|              ☆ InstallData | 20191230 |
|              □ InstallSource | C:\ProgramData\Package Cache\ {6BF11ECE-3CE8-4FBA-991A-155AA6BE5BF}\v15.0.1300.359\x64 |
|              ☆ Language | 1033 |
|              □ ModifyPath | MsiExec.exe /I{6BF11ECE-3CE8-4FBA-991A-155AA6BE5BF} |
|              ☆ Publisher | Microsoft Coporation |
|              □ UninstallString | MsiExec.exe /I{6BF11ECE-3CE8-4FBA-991A-155AA6BE5BF} |
|              ☆ VersionMinor | 0 |
|              □ WindowsInstaller | 1 |
|          ▶ ★ Amazon SSM Agent | |
|          ▶ ★ Browser for SQL Server 2016 | |
|          ▶ ★ Evolven Analytics Server | |
|          ▶ ★ Evolven Enlight Agent | |
|          ▶ ★ Integration Services | |

FIG. 2A

| Path | | Key | Value |
|---|---|---|---|
| ▼◇AWS (local) 252 | | | |
| ▸◇Global Services | | | |
| ▼◉US East (N. Virginia) | | | |
| ▼◉EC2 | ▴◉ Properties | | |
| ▸☑ Addresses | ▫ AmiLaunchIndex | | 0 |
| ▸☑ CustomerGateway | ★ Architecture | | x86_64 |
| ▸☑ Images | ▫ CapacityReservationSpecification | | {CapacityReservationPreference: open} |
| ▼☑ Instance | ▫ ClientToken | | AB00D18D0A9AF3BDF930B431D873721E |
| ☑ 172.16.128.184 | ▫ EbsOptimized | | false |
| ☑ 172.16.129.204 | ▫ EnaSupport | | true |
| ☑ 172.16.130.1 | ▫ HibernationOption  Search for environments | | false |
| ☑ 172.16.130.13 | ▫ Hypervisor | 255 | xen |
| | ▫ IamInstanceProfile | | |
| | ★ ImageId | | ami-2a9a1655 |
| | ★ InstanceId | | i-0c4e7a70bc2bc6cc5 |
| | ★ InstanceType | | t2.medium |
| | ▫ KeyName | | liron |
| | ▫ LaunchTime | | Sun Jul 15 08:15:51 PDT 2018 |
| | ▫ Monitoring | | disabled |
| | ▫ Platform | | windows |
| | ▫ PrivateDnsName | | |
| | ▫ PrivateIpAddress | | 172.16.130.1 |
| | ★ PublicDnsName | | |
| | ▫ RootDeviceName | | dev/sda1/ |
| | ▫ RootDeviceType | | ebs |
| | ▫ SourceDestCheck | | true |
| | ★ State | | running |
| | ▫ StateTransitionReason | | |
| | ▫ SubnetId | | subnet-0944873c8931734a9 |
| | ▫ VirtualizationType | | hvm |
| | ★ VpcId | | vpc-0bef896fa0b4c4ce9 |
| | ▸◉ BlockDeviceMappings | | |

FIG. 2B

```
15 ▼ Manifest:
16     name: Deployment 12.3.123
17     created_by: Deployment Pipeline
18     created_at: 2022-08-25 17:15:21
19
20 ▼  environment:
21   ▼  tags:
22          - prod
23          - blue
24        name: PredictionService
25        environment-type: WIN-OS
26        stage: *
27
28 ▼  configuration:
29   ▼  - name: MicrosoftEdgeElevationService
30        path:OS/OSSWConfig/Services/MicrosftEdgeElevationService/
31        Property: Path
32        value: C:\Program Files\Microsft\Edge\Application\*\elevation_service.exe
33
34      - name: MicrosoftEdgeElevationService
35        path:OS/OSSWConfig/Services/MicrosftEdgeElevationService/
36        property: Version
37        value: >99.0.1150.55
```

FIG. 3

| Environment | Configuration | Parameter | Consistency | Snapshot 1 | Snapshot 2 | Snapshot 3 | Snapshot 4 |
|---|---|---|---|---|---|---|---|
| F5-Bigip | F5 Configuration//config/bigip/auth | Checksum[Md5] | Inconsistent | ecf6d9e4b0cd2 3456453212c4c 5b6 | ecf6d9e4b0cd23456 453212c4c5b6 | ecf6d9e4b0cd23456 453212c4c5b6 | ecf6d9e4b0cd23456 453212c4c5b6 |
| Network Devices | hosts.csv /configuration/cap02d/Table | Guid | Inconsistent | missing | 847721 | 847721 | 847721 |
| Network Devices | hosts.csv/configuration/fcr00H0.mu c.amadeus.net/Table | Guid | Inconsistent | 21931301 | 21931301 | 91983771 | 21931301 |
| MSSQL – ARIS_MODELLER/CTOProc | Database/Programmability/Stored Procedures/Table | routine_definition | Inconsistent | CREATE PROCEDURE [up_killconn] | missing | missing | missing |
| Tomcat:80 | File System | log.level | Inconsistent | TRACE | ERROR | ERROR | ERROR |
| esi.il.MultiDomains/DOMAIN BBB/Accounts | OU Configuration/OU settings/Security/DACL PROPERTIES/Table | -- | Inconsistent | missing | allow | allow | allow |
| Microsoft Windows 7 | OS/TimeZoneInformation/Table | TimeZoneInformation | Consistent | 1 | 1 | 1 | 1 |
| MSSQL – ARIS_PUBLISHER | Registry/HKEY_LOCAL_MACHINE/SO FTWARE/Microsoft/Microsoft SQL Server/MSSQL10_50.ARIS_PUBLISHE R/Setup/SQL_Engine_Core_Inst/103 3/Table | PatchLevel | Consistent | 10.50.1605.2 | 10.50.1605.2 | 10.50.1605.2 | 10.50.1605.2 |
| MSSQL – ARIS_MODELLER/CTOProc | Database/Tables/dbo.LDSDuplicates /Table Columns/Table [ key = column_name ] | character_maximum _length | Consistent | 1120 | 1120 | 1120 | 1120 |
| IIS | Signature/C:/Windows/system32/in etsrv | Version | Consistent | 7.7.6501.13444 | 7.7.6501.13444 | 7.7.6501.13444 | 7.7.6501.13444 |
| Microsoft Windows 2008/Terminal Server Settings/Console | Terminal Services Configuration | LevelOfControl | Consistent | 2 | 2 | 2 | 2 |
| Tomcat:80/Catalina [Catalina]/localhost | File System/Server.xml | autoDeploy | Consistent | false | false | false | false |
| Tomcat:80/Catalina [Catalina]/localhost | File System/Server–default.xml | autoDeploy | Consistent | false | false | false | false |
| Tomcat:80 | File System/Main Server Configuration/Connectors | connectionTimeout | Consistent | 250 | 250 | 250 | 250 |
| Tomcat:80/localhost/config | File System/Manifest | Built–By | Consistent | michaeln | michaeln | michaeln | michaeln |

FIG. 9

AUTOMATED PREDICTIVE CHANGE ANALYTICS

FIELD OF THE DISCLOSURE

The present disclosure relates to a change analysis system for determining a risk level for proposed changes in an IT environment.

BACKGROUND OF THE DISCLOSURE

The increasing role of software in business puts pressure on companies to deliver high-quality software applications quickly to stay competitive in their respective markets.

Change management (or enablement) is an IT practice designed to minimize disruptions to IT services while making changes to business-critical systems and services. A change to IT infrastructure, applications, configurations, data or code is adding, modifying, or removing anything that could have a direct or indirect effect on services, for example, rolling out new services, managing existing ones, or resolving problems in code. Change management practices are designed to reduce incidents and meet regulatory standards by providing context and transparency, avoid bottlenecks, and minimize risk.

The ITIL standard defines the change management process as the "change control" practice that ensures "that risks are properly assessed, authorizing changes to proceed and managing a change schedule in order to maximize the number of successful service and product changes." In many traditional IT organizations, a change advisory board (CAB) is tasked with assessing the risks of and approving (or not approving) each change. Typically, the CAB holds regularly scheduled meetings to review all proposed upcoming changes, pulling in experts as needed to explain, defend, or assess the changes with them. While dealing with challenges around risk and compliance, auditability, and cross-team coordination, the change management process too often becomes complex, bureaucratic, slow, and painful.

DevOps is a set of practices that combines software development and IT operations. It aims to shorten the software development life cycle and provide continuous delivery with high software quality. A key component of DevOps implementation is Continuous Integration and Continuous Deployment (CICD) pipeline allowing teams to produce and release software in short cycles. CICD pipeline introduces automated building, testing, and deployment to environments across all the stages of the change lifecycle with the aim to flag failures and issues early before they are promoted to the next stage of the process.

This leads to a dilemma—developers want to roll out code quickly, without expending additional time and effort on manual documentation; IT operations teams seek to reduce risk, maintain detailed records for audits, and avoid incidents. Asking developers to add an extra step to their processes, write things down, clock in and clock out causes them to feel like they are being prevented from dealing with the ultimate goals of their jobs. Asking the operations teams to overhaul existing processes, lifting approval checks, and leaving more to automation is not easy and can feel like it's creating more risk.

To resolve this dilemma, it is desirable to automate the change management process and shift away from lengthy reviews and non-technical stakeholder approvals.

SUMMARY OF THE DISCLOSURE

An aspect of an embodiment of the disclosure, relates to a system and method of analyzing planned changes to an IT environment and automatically determining a risk of the changes. The risk value can be used to authorize low risk changes automatically. A computerized system periodically collects configuration information of the IT environment and stores the information in a database. When a change is requested, for example to update software, install new software or upgrade hardware, the computerized system is provided with a manifest that defines the changes. The computerized system obtains a current environment state snapshot of the environment and forms a simulated environment snapshot, of the state after applying the change, with the help of the manifest. The computerized system analyzes the environment state snapshot and the simulated environment state snapshot and provides a risk score of the change. Based on the risk score the computerized system decides if to automatically apply the change or to wait for further investigation by an administrator and/or authorization by a change advisory board.

There is thus provided according to an embodiment of the disclosure, a method of evaluating change risk in an IT environment, comprising:

Collecting environment state snapshots of configuration parameters in the IT environment;

Invoking a manifest of a change on the environment state snapshots to form simulated environment state snapshots;

Analyzing the simulated environment state snapshots relative to the environment state snapshots;

Deriving a risk score based on the analysis;

Selectively performing the change responsive to the risk score.

In an embodiment of the disclosure, the collecting is performed by an agent installed on workstations of the environment. Optionally, the collecting is performed by an application that queries the workstations of the environment. Alternatively or additionally, the collecting is performed by a combination of agents installed on workstations of the environment and querying workstations of the environment. In an embodiment of the disclosure, a current environment state snapshot is collected on the fly if not available when requested. Optionally, the manifest is acquired by an automatic scanning process in which the change is implemented in a test environment and comparing a configuration snapshot before and after the implementation. Alternatively, the manifest is acquired from the change manufacturer. Alternatively, the manifest is acquired by simulation of the commands of the change. Alternatively, the manifest is acquired by machine learning from past requests. In an embodiment of the disclosure, the risk score includes consideration of a drift pattern; wherein configuration parameters that were consistent before the change and are not consistent after the change or vice versa are assigned a high risk, and configuration parameters that were not consistent before the change and are still not consistent after the change are assigned a low risk.

There is further provided according to an embodiment of the disclosure, a computer system for evaluating change risk in an IT environment, comprising:

A computer with a processor and memory;

An application configured to be executed by the computer and configured to perform the following:

Collecting environment state snapshots of configuration parameters in the IT environment;

Invoking a manifest of a change on the environment state snapshots to form simulated environment state snapshots;

Analyzing the simulated environment state snapshots relative to the environment state snapshots;
Deriving a risk score based on the analysis;
Selectively performing the change responsive to the risk score.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein:

FIG. 2A is a schematic illustration of a hierarchical environment state snapshot, according to an embodiment of the disclosure;

FIG. 2B is a schematic illustration of a flat environment state snapshot, according to an embodiment of the disclosure;

FIGS. 3 is a schematic illustration of a manifest, according to an embodiment of the disclosure;

FIG. 9 is a table of exemplary results of consistency analysis, according to an embodiment of the disclosure.

DETAILED DESCRIPTION

Figure 1:
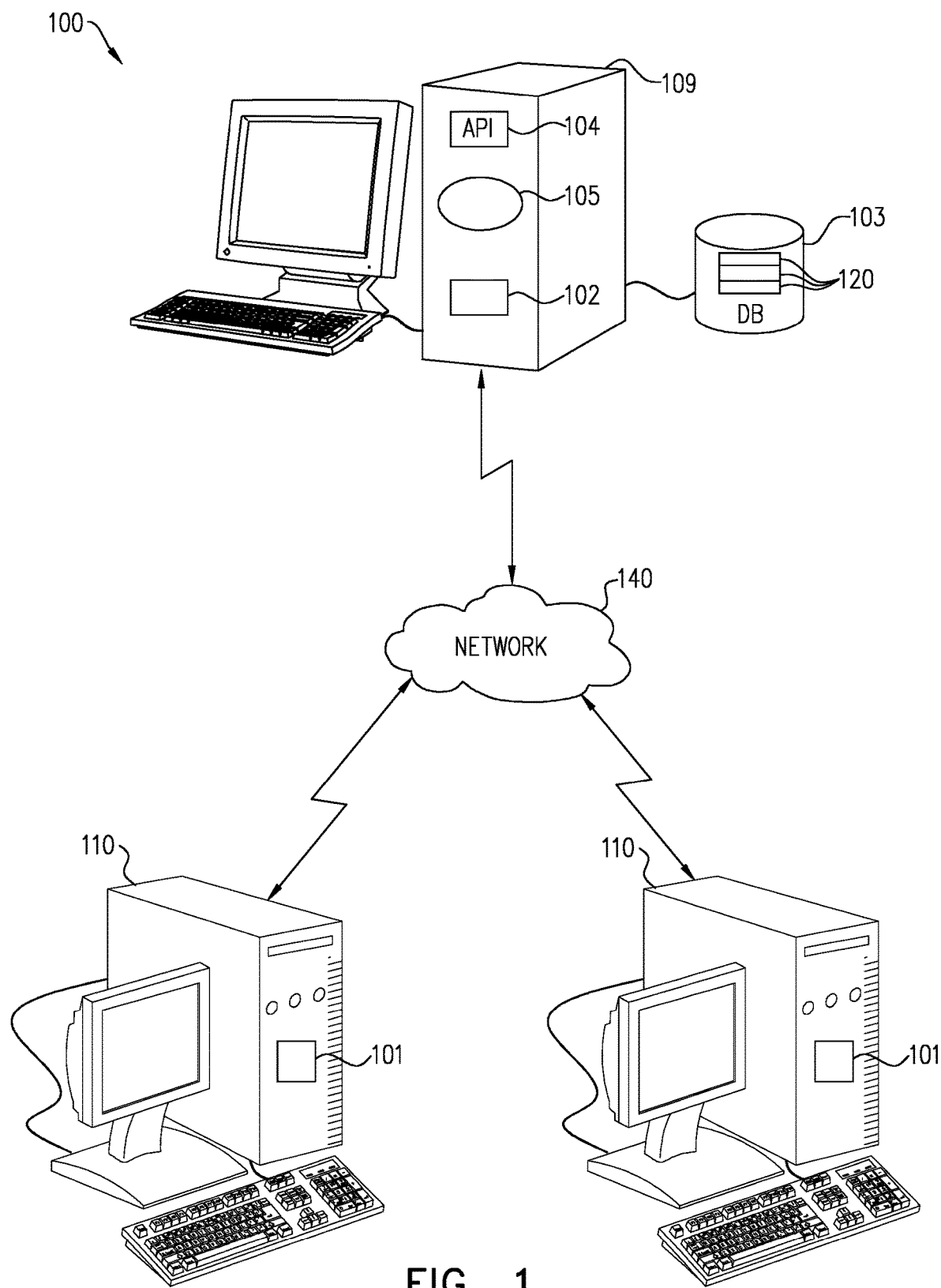
FIG. 1 is a schematic illustration of a computerized system configured to store environment configuration snapshots, according to an embodiment of the disclosure.
Figure 5:
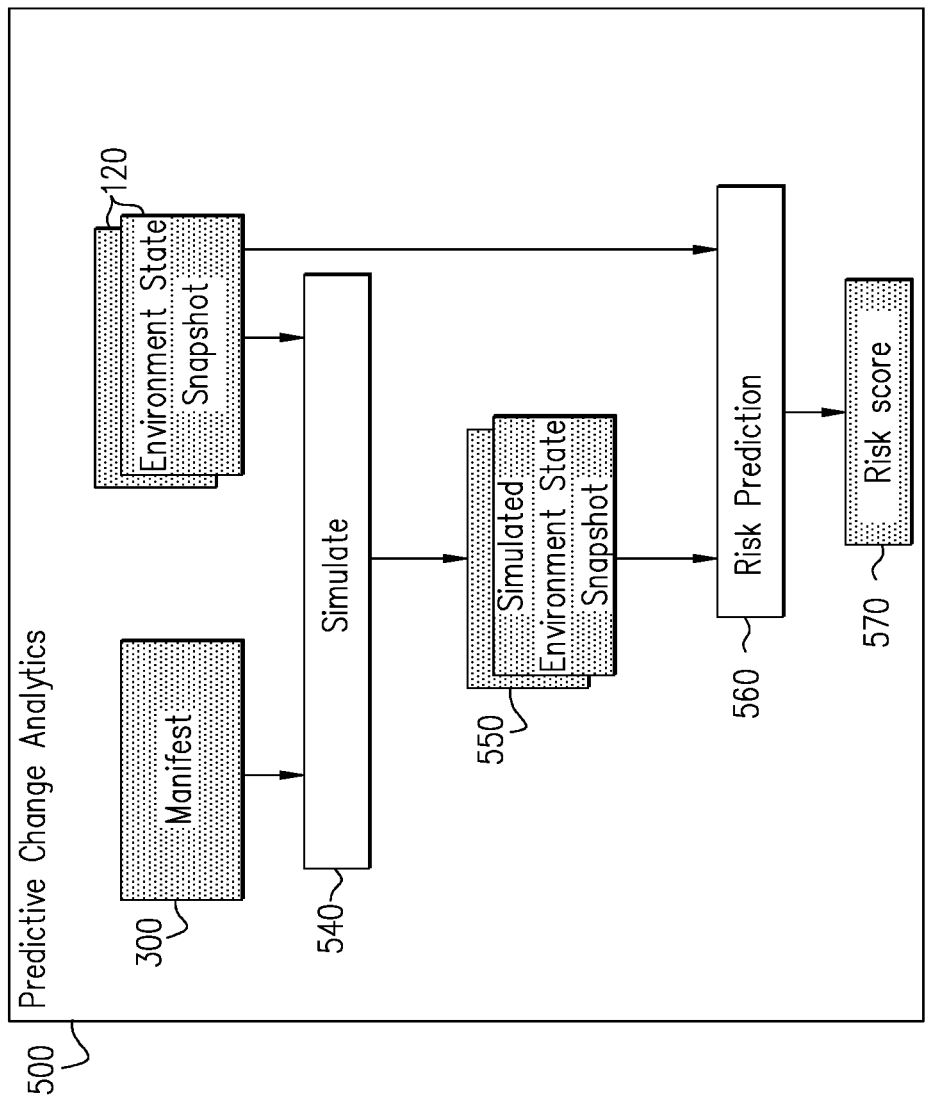
FIG. 5 is a flow diagram of a procedure of predictive change analytics, according to an embodiment of the disclosure.

FIG. 1 is a schematic illustration of a computerized system 100 configured to store environment state snapshots 120, and FIG. 5 is a flow diagram of a procedure 500 of predictive change analytics. In an embodiment of the disclosure, computerized system 100 executes an application 105 that is configured to collect and store state snapshots of configuration parameters of an IT environment and evaluate the risk in performing modifications or changes to the environment. The IT environment may include a network 140 of computers belonging to an organization or a network 140 of computers of users that collaborate with each other. Alternatively or additionally, part of the IT environment may be implemented with cloud resources. Optionally, before implementing a change in the environment, procedure 500 is invoked with a manifest 300 of the changes to simulate 540 the modification, produce simulated environment state snapshots 550, analyze the simulated environment state snapshots relative to the stored environment state snapshots and perform a risk prediction 560, which produces a risk score 570, indicating how risky the changes are to functionality of the IT environment. In an embodiment of the disclosure, if the risk score 570 is greater than a threshold value, the change is considered dangerous and will not be automatically implemented. Instead, it may be reviewed by an administrator or other authority to decide if the change should be implemented. In contrast if the risk score is equal to or less than the threshold value it can be implemented automatically.

In an embodiment of the disclosure, computerized system 100 may be implemented as a single computer 109 with a processor and memory that provides services to an IT environment over network 140. Alternatively, computerized system 100 may be implemented as a group of computer stations that are accessible by the members of the IT environment. The computerized system 100 is configured to collect configuration parameters of the IT environment, for example which operating systems are used in each station, which type of hardware is used (e.g., computer/devices, network devices, storage devices), which software, database schema, cloud resources and other details.

Collection of the information may be performed by an:
1) Agent based collection application 101: by installing and running agent 101 on workstations 110 in the environment, e.g., the workstation 110 may be a client station or a server such as a host running an operating system (OS) and database server (or OS and web server) or any other workstation 110 connected to the network 140. Optionally, the agent 101 uses a library of predefined scripts to discover environment details; the agent 101 scans configurations for each discovered environment; reports discovered environments and scanned configurations back to a storage service (e.g., database 103). In some embodiments of the disclosure, subsequent scans are only incremental (e.g., sending only differences compared to the previous scan).
2) Agent-less collection application 102: computerized system 100 uses API's 104 to record information of an environment. Optionally, the environment might first return a list of resources; for each resource the environment returns a list of configurations (that can be nested) and optionally a relationship between them, discovered resources and configurations are reported back to the storage service (e.g., database 103) on computerized system 100. The computerized system 100 stores environment state snapshots 120 that include configuration data and meta-data of the environment, for example date and time of scan, environment (environment name, type, IP, location, zone, datacenter), scan length, user tags and other information. The information is stored into a persistent storage such as database 103. Optionally, the database may be a relational database or document based database.

Optionally, the snapshot collection can be from a combination of agent based and agent-less based collection.

In an embodiment of the disclosure, computerized system 100 analyzes environment state snapshots 120 to identify relationships between environments and configurations, for example by constructing dependency maps between the environment and the configuration. The dependency maps emphasize, which components depend from other components of the environment. Optionally, the dependency maps can be used to identify important differences resulting from implementation of a change to the environment.

In an embodiment of the disclosure, the API's 104 allow users to query computerized system 100 for an environment state snapshot 120. For example, a user can request to receive the latest environment state snapshot 120 for a selected host computer, server, workstation, network device, storage device, cloud resource or cloud environment, using a user interface (UI) or an API call or a database query). Optionally, the query may use meta-data (e.g., time, date, environment, host, resource, tags . . . ) as a parameter to retrieve a specific environment state snapshot 120, for example an environment state snapshot 120 with a specific date or that is not older than a certain date. In case it is not available, the storage service may trigger an appropriate collection mechanism to retrieve an up-to-date environment state snapshot 120 on the fly. In an embodiment of the disclosure, the user interface is implemented as a web service to request environment state snapshots 120.

FIG. 2A is a schematic illustration of a hierarchical environment state snapshot 200 and FIG. 2B is a schematic illustration of a flat environment state snapshot 250, according to an embodiment of the disclosure. Optionally, the environment state snapshot 120 can be organized in various forms, for example as a hierarchical list (e.g. environment state snapshot 200) or as a flat list (e.g. environment state snapshot 250).

In an embodiment of the disclosure, the Environment state snapshots (200, 250) comprise:

An environment (202, 252), for example, a server, a network device, a storage device, a database, a web server, a component, a cloud resource, a database, a git or SVN repository and others, described with a set of meta-attributes, for example
Environment name;
Environment type (Windows OS, MSSQL database, IIS website, EC2 Instance, Router ...);
Environment path;
Date when it was collected;
Location such as data center or data center zone;
Parent environment (e.g., host, cloud account, cloud service . . . ); i.e., environments can be organized hierarchically, for example,
   A cloud account (e.g., aws) may have several services (EC2, S3, VPC), each service may have several resource types (EC2 image, EC2 Instance . . . ), and each resource type might have several instances (EC2 Instance 1, EC2 Instance 2, EC2 Instance 3 . . . )
One or more configurations (203, 253) that can be organized hierarchically, e.g., a nested configurations as shown in FIG. 2A, or a flat configuration as shown in FIG. 2B
Each configuration may have one or more parameters (204, 254)
Each configuration parameter has a value (205, 255) that can be numerical, text, date, Boolean or structured such as a list of values, json, xml, etc.

As shown in FIG. 2A (hierarchical list):
200—Is an example of an environment state snapshot (e.g., configuration snapshot) visualized in GUI (configuration snapshot of environment "Microsoft Windows 2016 at host vm08-mgrTestAws");
201—A list of environments visualized in GUI as a tree;
202—An example of an environment (operating system "Microsoft Windows 2016");
203—An example of a configuration item (installed component "Active Directory Authentication Library for SQL");
204—Examples of configuration parameters;
205—Examples of configuration property values.
As shown in FIG. 2B (flat list):
250—An example of a configuration snapshot visualized in GUI (configuration snapshot of environment "AWS Instance 172.16.130.1 in N. Virginia zone in cloud account named AWS (local)");
251—A list of environments visualized in GUI as a tree;
252—An example of an environment (operating system "AWS Instance 172.16.130.1");
253—An example of a configuration item (properties of cloud resource AWS Instance 172.16.130.1);
254—Examples of configuration properties;
255—Examples of configuration property values.

Figure 4:
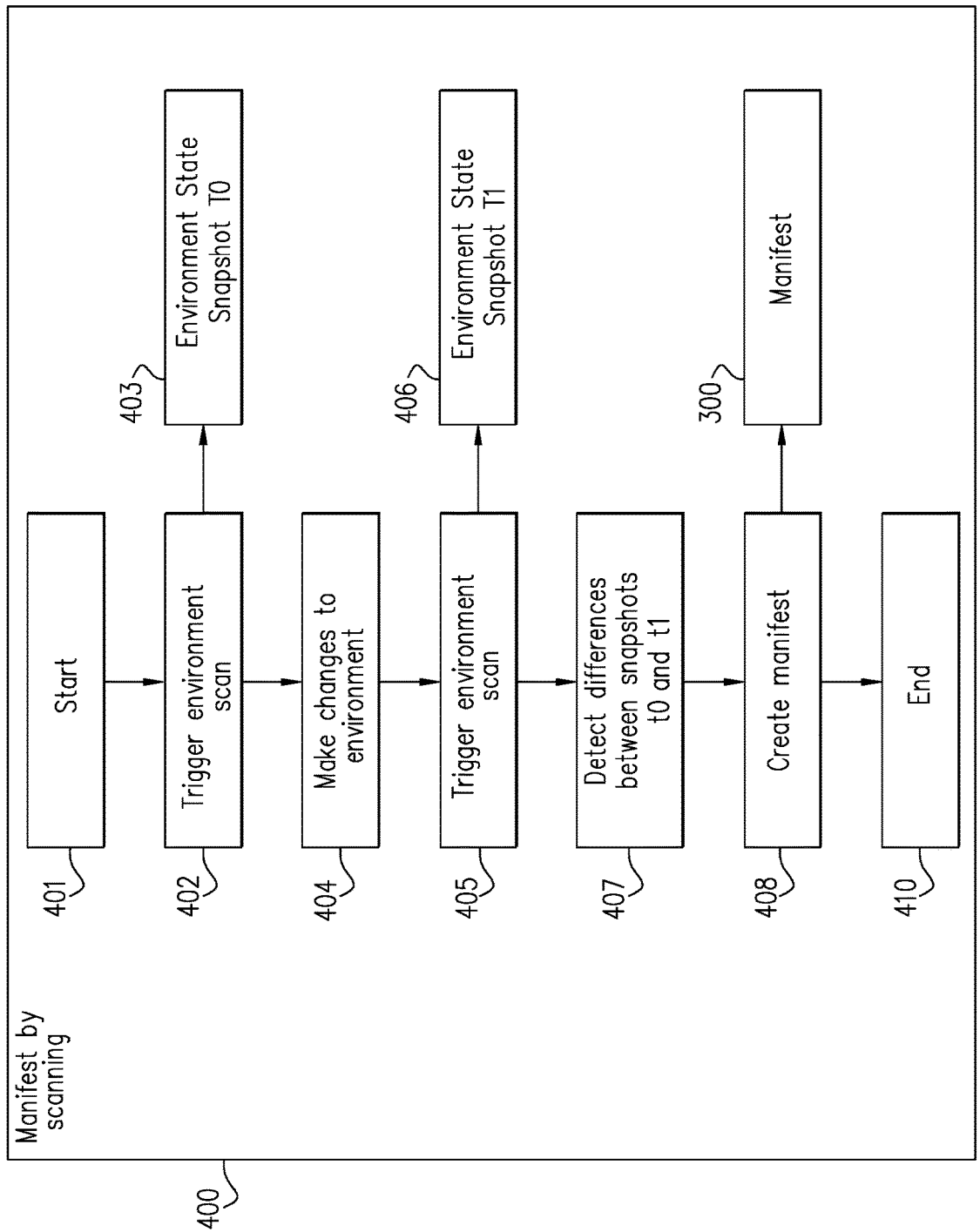
FIG. 4 is a flow diagram of a process of creating a manifest, according to an embodiment of the disclosure.

FIGS. 3 is a schematic illustrations of a manifest 300 and FIG. 4 is a flow diagram of a process 400 of creating a manifest 300, according to an embodiment of the disclosure. Manifest 300 is an object that specifies the changes that will be performed when modifying an environment. The manifest 300 is typically defined by:
Meta attributes 315, e.g., name, who created it, when it was created, version and other attributes;
Target environment 301, e.g., criteria 302 for searching environment by metadata (name, type, stage, data center . . . );
One or more configurations defining a target state 311, such as:
   Name and path 312, e.g., by path, resource and property, element in a configuration file etc.;
   Configuration property 313;
   Target value 314 defining expected property value, e.g., target value, target state, list of possible values or a pattern specifying the target state, rule.

In an embodiment of the disclosure, the manifest 300 can be stored in various formats, such as: YAML, JSON or XML.

FIG. 3 shows a manifest in YAML format comprising:
300—An example of a manifest definition in YAML format;
301—A section defining the environment where configurations will be applied;
302—An example of search conditions for the environment (e.g., tag that matches values prod or blue);
310—A section defining the target state of configurations;
311—An example of a single configuration definition;
312—An example of path configuration path specification;
313—An example of property specification;
314—An example rule specifying target property value.

In an embodiment of the disclosure, the manifest 300 may be created by the following methods implemented by different types of clients with different types of environments:
1. A manually written manifest written by an administrator of the environment;
2. An automatic scanning process 400 by a developer in a testing environment, comprising:
   a. Start the procedure (401) for a selected target environment;
   b. Trigger an environment scan (402) to obtain an initial environment configuration snapshot T0 (403);
   c. Apply changes to the environment (404), e.g., by triggering deployment of a modification or manually changing values or a combination of both, etc.;
   d. Trigger another environment scan (405) to obtain an updated environment state snapshot T1 (406);
   e. Compare snapshot T0 to snapshot T1 to detect differences (407);
   f. Run manifest creation procedure to automatically construct a manifest 300 based on the differences (408);
   g. End the procedure (410) and provide the manifest 300 to computerized system 100.

3. A listing provided by the manufacturer of the modification:
   a. From a deployment tool, or source code version control system (e.g. SVN or GIT or other similar version control tool) or web portal or manufacturer press release or manufacturer manifest or combination of these or some other similar source;
   b. Create a list of items that will be deployed to locations in the environment;
4. A simulation process:
   a. Use a list of imperative commands (e.g., script or list of commands/instructions) or declarative state definition;
   b. Use a tool (e.g., Terraform, SQL script simulation) that simulates imperative command execution or simulates implementation of declarative state definitions to derive a target environment state
   c. Use target environment state to create the manifest 300;
5. A Machine Learning process:
   a. Build a machine learning model that given a text in natural language (e.g., change request) and meta-data (e.g., target environment) produces a list of items that will be modified. Optionally training the model includes:
      1. Obtain environment configuration snapshots (e.g., once per hour for last 30 days), calculate changes between snapshots, use changes to create manifests;
      2. Obtain past change requests/deployments (e.g., last 30 days);
      3. Train a model that learns a mapping between change request/deployment text and manifests;
   b. Use the trained model to create the manifest 300.

The manifest 300 specifies the target environment state and can be used to verify changes (e.g. as described in U.S. Pat. No.: 11,290,325 published Mar. 29, 2022, the disclosure of which is incorporated herein by reference) or to execute changes (e.g., using Puppet, Chef that execute manifests). In an embodiment of the disclosure, the goal is to use the manifest 300 to analyze how the environment would look like if the manifest was already applied. The predictive analytics part consists of change prediction and risk estimation.

Figure 6:
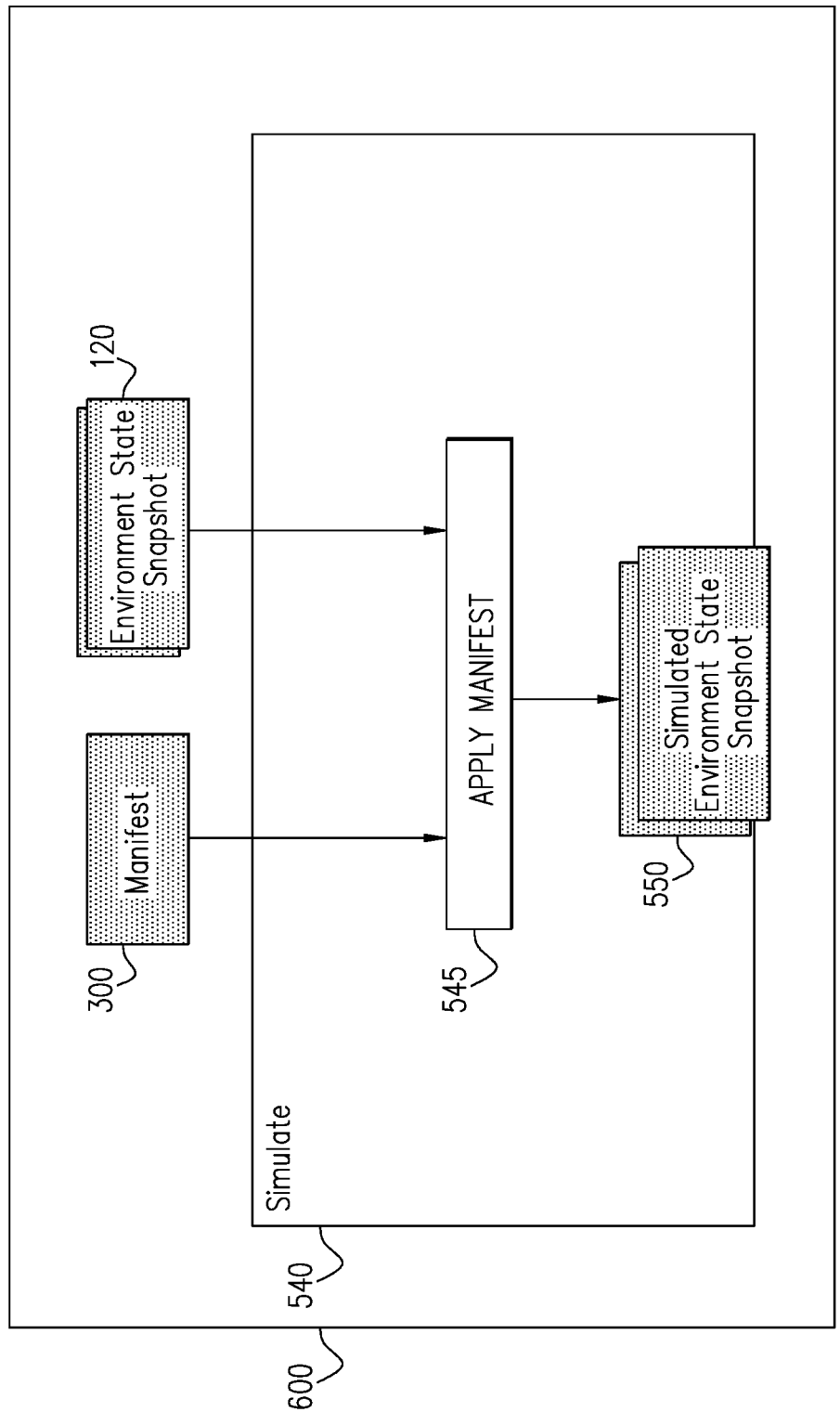
FIG. 6 is a flow diagram of a procedure for modifying an environment with a manifest, according to an embodiment of the disclosure.

As illustrated in FIG. 5 and FIG. 6, computerized system 100 accepts as input environment state snapshots 120, which may be for example hierarchical 200 or flat 250, and a manifest 300. Computerized system 100 simulates 540 applying 545 target configuration values defined in manifest 300 to environment state snapshot 120 and stores the results as a simulated environment state snapshot 550.

In an embodiment of the disclosure, computerized system 100 creates simulated environment state snapshots 550 by starting with a copy of the environment state snapshots 120 and then comparing the manifest environment search attributes with environment state meta-attributes as set forth below:

For each configuration definition in manifest 300:
  Search for a corresponding configuration in the environment state snapshot 120 using name, path, and property;
  If not found create a new configuration item and set to value;
  Otherwise modify value
    a) Modify value to specified value (if manifest defines value);
    b) Modify value to an initial default value if no value is specified.
    c) Remove value and/or property if manifest marks such value and/or property to be deleted The resulting amended environment state snapshot 120 is then provided as the simulated environment state snapshot 550.

In an embodiment of the disclosure, the simulated environment state snapshot 550 is then analyzed for risk prediction 560 to provide a risk score 570.

Figure 7:
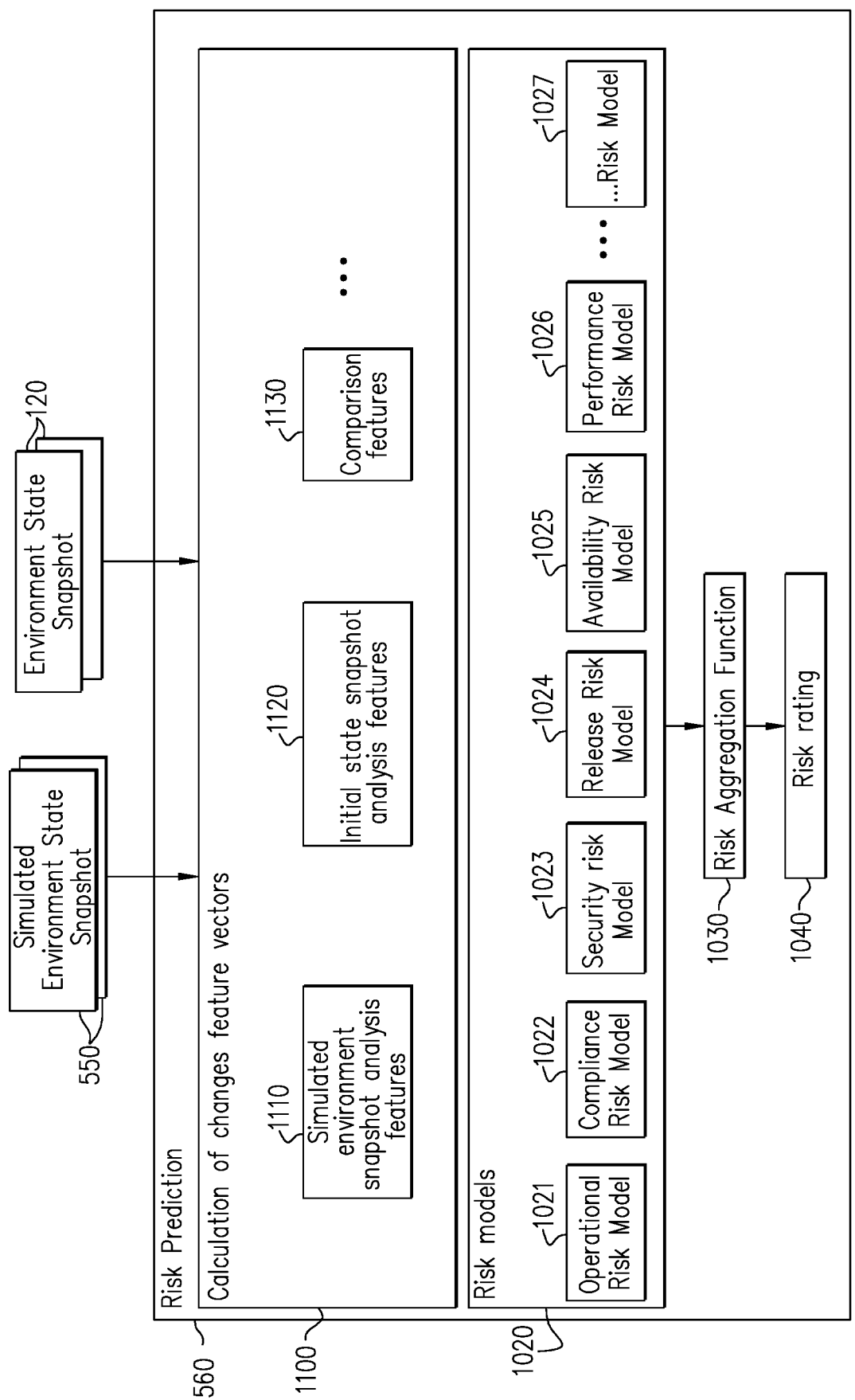
FIG. 7 is a schematic block diagram of a procedure for risk prediction, according to an embodiment of the disclosure.
Figure 8:
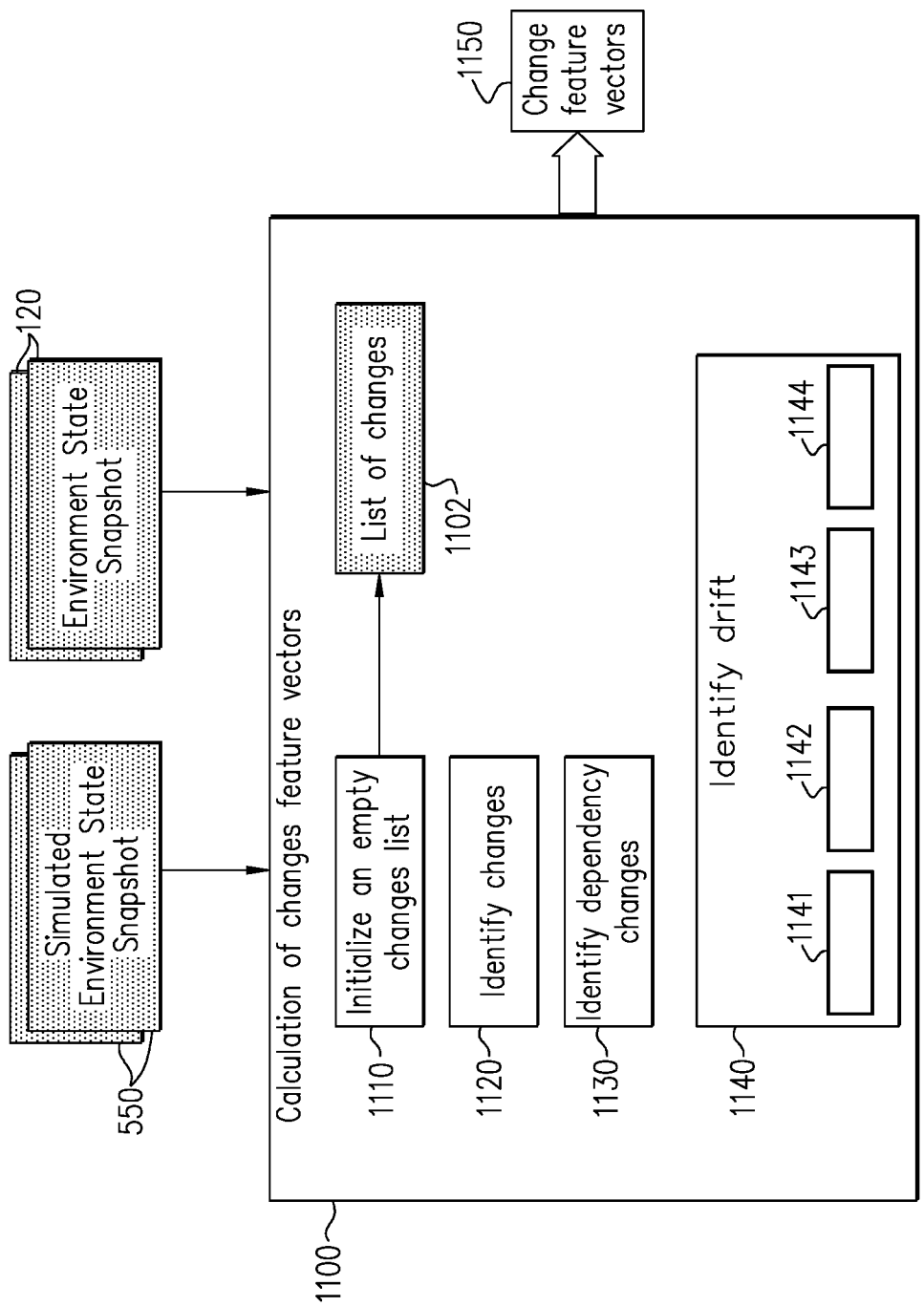
FIG. 8 is a schematic block diagram of components for calculating change feature vectors, according to an embodiment of the disclosure.

FIG. 7 is a schematic block diagram of a procedure for risk prediction 560, FIG. 8 is a schematic block diagram of components for calculating change feature vectors and FIG. 9 is a table of exemplary results of consistency analysis, according to an embodiment of the disclosure. The environment state snapshot 120 and the simulated environment state snapshot 550 are provided as input to risk prediction procedure 560.

In an embodiment of the disclosure, procedure 560 Calculates change feature vectors (1100) using several analysis mechanisms (1110, 1120, 1130)
1. Create an empty list of changes (1110)
2. Identify changes (1120)
   a. For each of the environment state snapshots 120, compare the environment state snapshot 120 to a corresponding simulated environment state snapshot 550 to detect differences;
   b. Add all differences to the list of changes (1102) (FIG. 8);
3. Identify dependency changes (1130)
   a. For each of the environment state snapshots 120, obtain a list of dependencies (e.g. by querying the database 103 of computerized system 100;
   b. Identify which of the dependencies in the corresponding simulated environment state snapshots 550 are changed (modified, added, or removed);
   c. Add the list of dependency changes to the list of changes (1102)
4. Detect new drift and drift being removed (1140), for example if initially a sequence of environment components have the same value and after the change, the components have different values (new drift) or if initially a sequence of environment components have different values and after the change have the same value (drift removed):
   a. Create a side-to-side comparison (1200) of all environment state snapshots 120 and organize configuration parameters in two groups (1201);
      1. Consistent parameters (1141), i.e., configuration values that exists in all environment state snapshots 120 and the value is the same;
      2. Inconsistent parameters (1142), i.e., all the others;
   b. Create a side-to-side comparison (1200—FIG. 9) of all simulated environment state snapshots 550;
      1. Consistent parameters (1143), i.e., configuration values that exist in all environment state snapshots and the value is the same;
      2. Inconsistent parameters (1144), i.e., all the others;
   c. Compare
      List configurations that
        (a) are not consistent but were before, i.e. are in list 1141 but not in list 1143, add them to the list of changes (1102);
        (b) were not consistent before but are now, i.e. are in list 1142 but are not in list 1142, add them to the list of changes (1102).
5. Alternatively or additionally, there can be additional components calculating changes, for example, changes in data distribution, changes in schema, changes in workload distribution etc.

In an embodiment of the disclosure, different risk models are applied to the change feature vectors 1150 to calculate risk score 570.

Optionally, different risk models 1020 or their combinations are applied to estimate the risk score, for example risk models 1021-1027.

1021 is an Operational Risk Model that analyzes configuration values to:
 a. Detect value anomalies (e.g., as described in U.S. Pat. No.: 10,635,557 published Apr. 28, 2020, the disclosure of which is incorporated herein by reference) and assign high risk to detected anomalies and vice-versa;
 b. Analyze drift patterns (1140) and assign a risk value, e.g., a high-risk value if the configuration was consistent before, but now it isn't or vice versa, and a low-risk value if it was not consistent before and now it still isn't;
 c. Matching user-defined rules for operational risk; for example, having a database where each rule defines a condition on configuration and configuration value (e.g., connection pool size parameter =<0), and rule severity (e.g., high risk);

1022 is a Compliance Risk Model that estimates risk of configuration not complying with compliance standards (CIS AWS/Azure, CIS Controls, GDPR, HIPAA, ISO 27001, NIST SP 800-53, PCI-DSS, SOC 2 or others) or internal enterprise compliance regulations:
 a. Using a database that contains a matching rule and severity level if matched;
 b. Compare against such databases and highlight if there is a match;
 c. This risk model can try to match user-defined rules or rules constructed by a compliance standard; for example, in the database each rule defines a condition on configuration and configuration value (e.g., if not (log_rotation is defined and log_rotation is enabled)), and rule severity (e.g., high risk);
 d. The rules can be automatically imported from external compliance control frameworks (e.g., OpenScap, . . . );

1023 is a Security Risk Model that handles;
 a. A vulnerability database comprising rules such as best practices rules, security hardening rules;
 b. Such a database contains a matching rule and severity level if matched;
 c. Compare against such databases and highlight if there is a match;
 d. This risk model can try to match user-defined rules; for example, in a database where each rule defines a condition on configuration and configuration value (e.g., log4j version is less than 2.17.0), and rule severity (e.g., high risk);
 e. The rules can be automatically imported from external vulnerability databases (e.g., CVE, NVD, . . . );

1024 is a Release Risk Model that handles:
 a. Artifact anomaly; analyze past artifact deployments to establish a baseline how frequently an artifact is deployed, what is the typical size of the artifact, what are typical components of the artifact, what are external libraries and assets included in the artifact etc.; once a new artifact is being deployed compare the artifact properties to the baseline and calculate a difference from the baseline; alternatively an anomaly-based machine-learning algorithm such is k-nearest neighbors to estimate typical variability between artifacts and how different is the latest variability; use historical data to estimate threshold for anomalous variability; assign high risk to high anomaly variability;
 b. Developer anomaly; analyze past deployments and code changes to establish a relationship between packages/components and developers making source code contributions to the packages; when a new deployment is released, compare if developers contributing to packages/components match previously established relationships; if there is no match, e.g. a developer is contributing to a package/component he never worked on before, assign high risk,
 c. Deploying new code with low coverage; analyze automated test coverage report and source code changes to identify if there are any new/modified codes of line in the deployment that were not covered by automated tests; optionally or in addition, estimate the impact of such lines of code (e.g. adding dependency is higher impact compared to removing dependency, many lines of code edited/added has higher impact compared to few lines of code being edited/added); assign high risk if new/edited untested code (optionally with high impact) is being part of deployment.

1025 is an Availability Risk Model (aka blast radius analysis) configured to:
 Use simulated environment state to construct service and configuration dependency map (e.g., as described in U.S. Pat. No.: 10,635,557 published Apr. 28, 2020, the disclosure of which was previously incorporated herein by reference);
 Assuming the change will cause the updated component to stop working;
 List all the components that might be affected by this component not being available:
  a. Assume this component will stop working as well, follow dependencies;
  b. List all potentially affected components;
  c. Assign high risk if affected components have other dependencies that will be affected

1026 is a Performance Risk Model configured to calculate a risk:
 a. Based on historical data;
  a) Compile a database of past deployments described with certain parameters (e.g., environment, developer/team developing the update, size of change, type of change, target . . . )
  b) Compile a database of performance alerts and/or performance incidents;
  c) Establish a relationship between deployment parameters and alerts that happened in a certain time period after deployment;
  d) Compare deployment parameters to established relationships (e.g., by matching, or by machine learning methods, for example, k-nearest neighbors, neural networks, support vector machines, decision trees, etc.) to determine if similar deployment parameters lead to performance issues in the past; if such comparison confirms past performance issue, assign high risk;
 b. Based on "simulation of change";
  Use a simulation tool to simulate how the system will perform after an update, e.g., by having a black-box model that simulates how the system operates given a set of configuration parameters, if the results of such a simulation indicate degradation of performance, assign a high risk;
 c. Based on rules;
  Setup a set of user-defined rules from past experiences, e.g., changes to data-access layer in the code impact performance of data access performance; for example, there is a database where each rule defines a condition on configuration and configuration value (e.g., a filename that matches the following pattern *dal*.java), and rule severity (e.g., high risk);

1027 represents other risk models.

In an embodiment of the disclosure, the risk model scores are aggregated with a risk aggregation function 1030. Optionally, the function provides a numeric value, for example 1-100. In some embodiments, the risk score produced by aggregation function 1030 might be processed with the risk rating 1040 component that maps and calibrates the risk score to a set of predefined risk categories. Alternatively, the score may be compared to a threshold value and provide a few specific values, e.g., high risk, medium risk, low risk by being compared to the threshold value. Further alternatively, the risk score may be determined based on a set of rules, for example using a decision tree. Optionally, the decision score may be provided with messages from a list of messages, providing an indication of the logic behind the score, for example that a specific rule is violated or that the risk is the result of exceeding a combined risk.

In an embodiment of the disclosure, computerized system 100 automatically analyzes installation of software updates, modifications, and new applications. The computerized system 100 may prevent installations and provide feedback to an administrator if the risk score is above a threshold value or matches a certain risk rating. Optionally, the administrator may authorize the modification by accepting the risk or resolve issues causing the risk so that the modification may proceed. In some embodiments of the disclosure, the administrator response is captured by the risk models (e.g., 1021-1027) to learn from the response for handling future cases.

Figure 10:
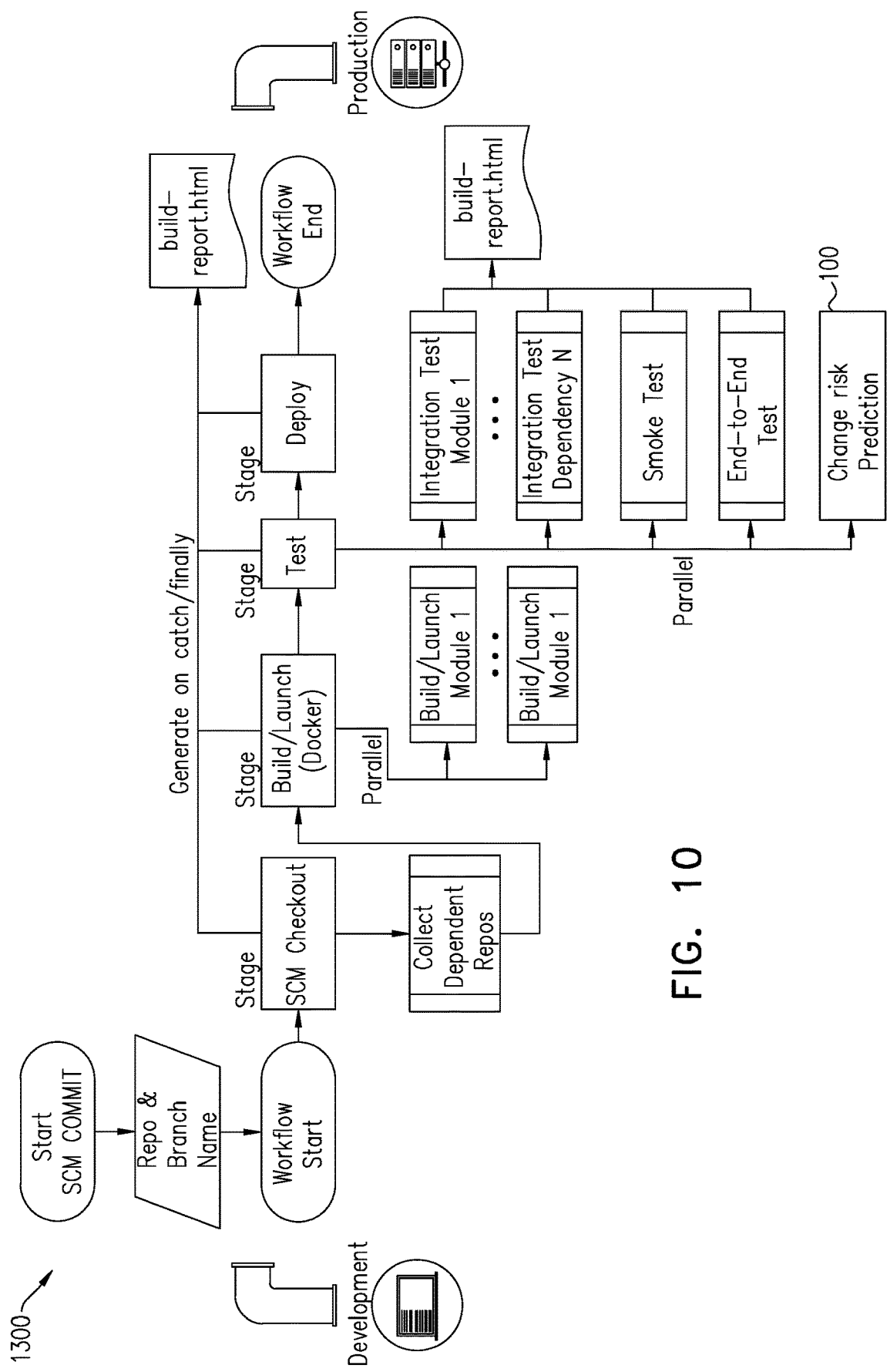
FIG. 10 is a block diagram of a CICD system, according to an embodiment of the disclosure.

Usage examples:

FIG. 10 is a block diagram of a CICD system 1300, according to an embodiment of the disclosure.

Example 1: CICD Pipeline

Continuous integration and continuous deployment (CICD) pipeline is a key component in DevOps strategy allowing teams to produce and release software in short cycles. CICD pipeline introduces automated building, testing, and deployment to all the stages of environment (i.e., from lower to higher environments for example, development, testing, quality assurance, pre-production, production and disaster recovery). The testing is quite rigorous, and the environments are increasingly more similar to production environment with the aim to flag failures and problems early before they are promoted to the next stage of the process.

Computerized system 100 can be used as a gateway in a CICD pipeline to estimate future impact of changes in higher environments. For example, after changes are being deployed to test the environment, create a manifest of changes, and examine how such changes would impact a production environment.

Procedure:

When a run of a pipeline is triggered a. Before deploying to lower environment (e.g., test), trigger scanning of the environment (402);
b. Deploy changes (software artifacts) using a deployment tool;
c. Re-scan the environment to create a manifest (406-409);
d. Run predictive change analytics by simulating application of the manifest to the production environment (500);
e. If the resulting risk (1040) is high, stop the pipeline and provide an alert message to developers to resolve the issue or accept the risk.

Example 2: Conventional (legacy) applications

Conventional applications, legacy applications or business critical applications may still involve change advisory board (CAB) approvals which slows down the speed of changes and adds an additional burden on the decision process. Predictive change analytics can help evaluate planned changes to identify low risk changes that can lead to automatic CAB approval.

In this case, computerized system 100 can be used as follows:

a. Perform an Initial scan of pre-production environment (402);
b. Manually/automatically execute changes to the pre-production environment (re-configuration, patching, deployment of artifacts, manual script configuration and running) (404);
c. Re-scan the pre-production environment and create a manifest (406-409);
d. Obtain a recent production environment snapshot from computerized system 100 (which can trigger a scan if no recent snapshot is available);
e. Run predictive change analytics (500) using the manifest and the production environment snapshot;
f. If the resulting risk (1040) is low, proceed with the changes to the production environment;
g. If risk is not low (1040), involve CAB to accept the risk or to request risk mitigation.

In an embodiment of the disclosure, an application for performing predictive change analytics is stored on a non-transitory storage medium, such as a DVD, CD, external USB disk, disk-on key or other device. The medium may be provided to a general-purpose computer to be executed to serve as computerized system 100 and provide the service of predictive change analytics. The medium may include an external disk, a disk on key, a DVD or other storage media.

It should be appreciated that the above-described methods and apparatus may be varied in many ways, including omitting or adding elements or steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A method of evaluating change risk in an IT environment, comprising:

collecting environment state snapshots of configuration parameters in the IT environment;

invoking a manifest of a change on the environment state snapshots to form simulated environment state snapshots; wherein the manifest is an object that specifies the changes that will be performed when modifying the environment;

analyzing the simulated environment state snapshots relative to the environment state snapshots;

deriving a risk score based on the analysis wherein the risk score includes consideration of a drift pattern; wherein configuration parameters representing a sequence of environment components that were consistent having a same value before the change and are not consistent after the change or vice versa assigned a high risk, and configuration parameter that were not consistent before the change and are still not consistent after the change are assigned a low risk selectively performing the change responsive to the risk score.

2. The method of claim 1, wherein the collecting is performed by an agent installed on workstations of the environment.

3. The method of claim 1. wherein the collecting is performed by an application that queries the workstations of the environment.

4. The method of claim 1, wherein the collecting is performed by a combination of agents installed on workstations of the environment and querying workstations of the environment.

5. The method of claim 1, wherein a current environment state snapshot is collected on the fly if not available when requested.

6. The method of claim 1, wherein the manifest is acquired by an automatic scanning process in which the change is implemented in a test environment and comparing a configuration snapshot before and after the implementation.

7. The method of claim 1, wherein the manifest is acquired from the change manufacturer.

8. The method of claim 1, wherein the manifest is acquired by simulation of the commands of the change.

9. The method of claim 1, wherein the manifest is acquired by machine learning from past requests.

10. The method of claim 1, wherein the risk score includes consideration of artifact anomalies that include: analyzing past artifact deployments to establish a baseline how frequently an artifact is deployed, what is the typical size of the artifact, what are typical components it the artifact, what are external libraries and assets included in the artifact, and once a new artifact is deployed comparing the artifact properties to the baseline and calculate a difference from the baseline.

11. A computer system for evaluating change risk in an IT environment, comprising:
   a computer with a processor and memory:
   an application configured to be executed by the computer and configured to perform the following;
   collecting environment state snapshots of configuration parameters in the IT environment;
   invoking a manifest of a change on the environment state snapshots to form simulated environment state snapshots; wherein the manifest is an object that specifies the changes that will be performed when modifying the environment;
   analyzing the simulated environment state snapshots relative to the environment state snapshots;
   deriving a risk score based on the analysis wherein the risk score includes consideration of a drift pattern; wherein configuration parameters representing a sequence of environment components that were consistent having a same value before the change and are not consistent after the change or vice versa are assigned a high risk and configuration parameters that were not consistent before the change and are still not consistent after the change are assigned a low risk selectively performing the change responsive to the risk score.

12. The system of claim 11, wherein the collecting is performed by an agent installed on workstations of the environment.

13. The system of claim 11, wherein the collecting is performed by an application that queries the workstations of the environment.

14. The system of claim 11, wherein the collecting is performed by a combination of agents installed on workstations of the environment and querying workstations of the environment.

15. The system of claim 11, wherein a current environment state snapshot is collected on the fly if not available when requested.

16. The system of claim 11, wherein the manifest is acquired by an automatic scanning process in which the change is implemented in a test environment and comparing a configuration snapshot before and after the implementation.

17. The system of claim 11, wherein the manifest is acquired from the change manufacturer.

18. The system of claim 11, wherein the manifest is acquired by simulation of the commands of the change.

19. The system of claim 1 wherein the manifest is acquired by machine learning from past requests.

20. A non-transitory computer readable medium comprising an executable program configured to perform the method of claim 1.

* * * * *